Patented Apr. 16, 1929.

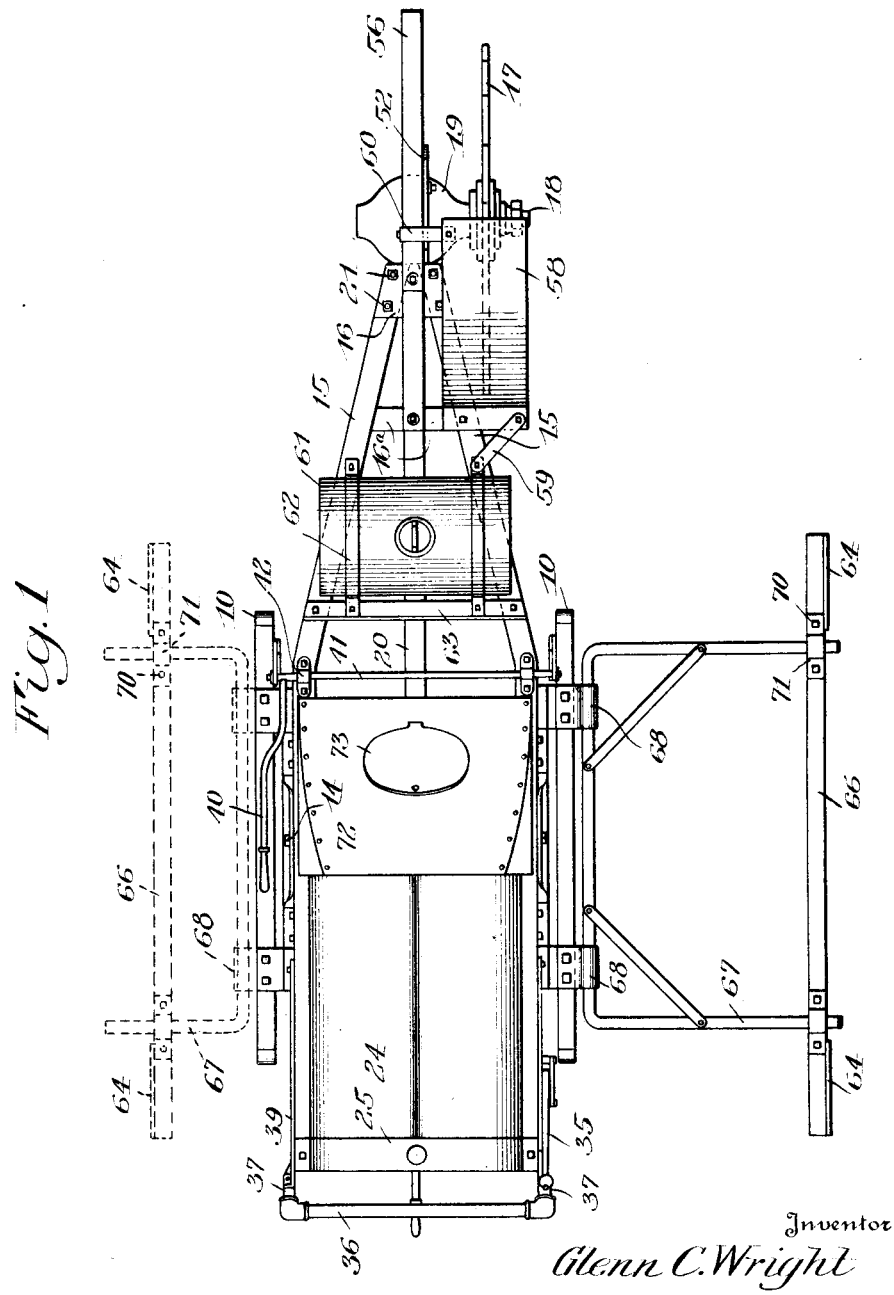

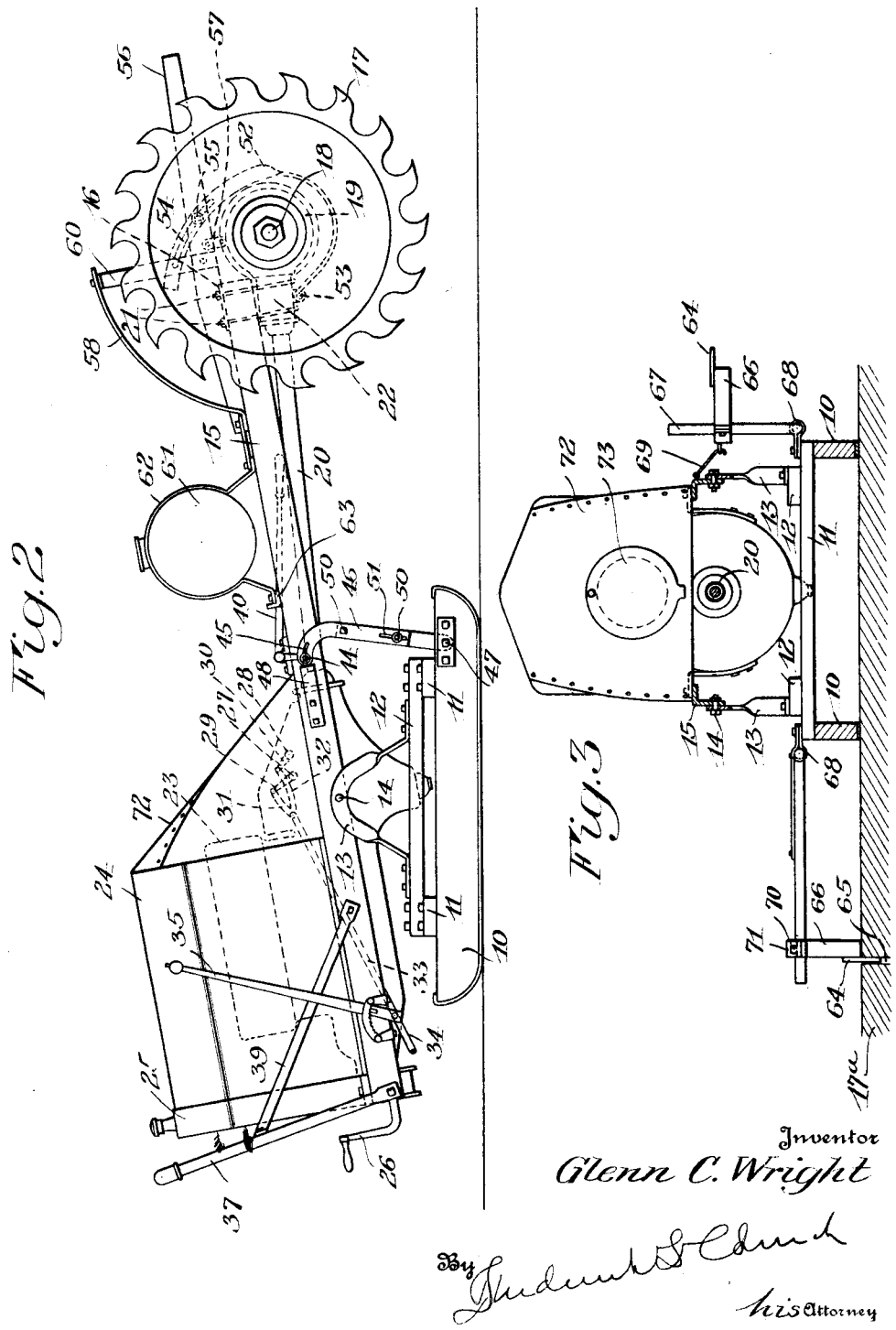

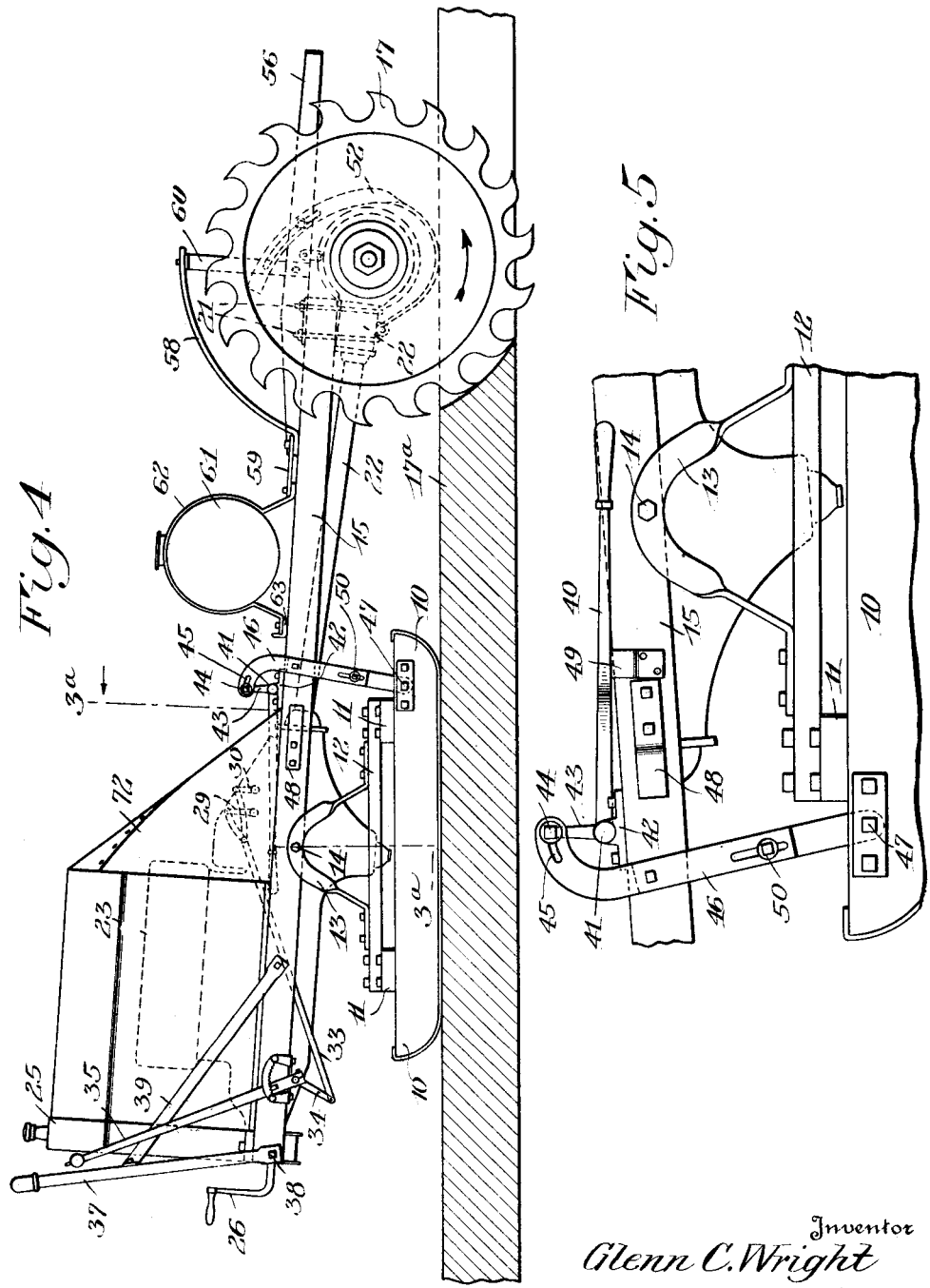

1,709,422

UNITED STATES PATENT OFFICE.

GLENN C. WRIGHT, OF CATO, NEW YORK.

ICE-CUTTING MACHINE.

Application filed January 24, 1925. Serial No. 4,467.

The present invention relates to ice cutting machines, and has for its object to provide an improved machine of this type which is simple in construction, economical to manufacture and comparatively inexpensive to operate.

A further object of the invention is to provide an improved power driven ice cutting machine adapted to be advanced by the ice cutting means thereof.

A further object of the invention is to provide an ice cutting machine embodying a sled or support and a frame pivoted thereon intermediate its ends with ice cutting means and operating means therefor so positioned upon the frame as to afford a substantially balanced unit capable of being easily rocked to move the cutting means into and out of engagement with the ice.

Another object of the invention is to provide an improved motor driven ice cutting machine including improved means for steering or guiding the same.

To these and other ends the invention resides in certain improvements and combinations of parts, all as will be hereinafter more fully described, the novel features being pointed out in the claims at the end of the specification.

In the drawings:—

Figure 1 is a plan view of a machine embodying the invention;

Figure 2 is a side elevation of the same showing the cutting element raised to inoperative position;

Figure 3 is a transverse sectional elevation taken on line 3ª—3ª of Figure 4;

Figure 4 is a side elevation similar to that shown in Figure 2 with the cutting element shown in operative position, and Figure 5 is an enlarged fragmentary side elevation of the control means for moving the frame to raise and lower the cutter.

Similar reference numerals throughout the several views indicate the same parts.

In the drawings I have shown a suitable support for the machine adapted to travel upon the ice, preferably comprising a sled embodying the runners 10, the cross tie members 11 and the longitudinally extending bars 12, all suitably connected in any approved manner. Extending upwardly from the bars 12 are a pair of brackets 13 having suitable pivots 14 upon which the frame of the machine is adapted to swing. The frame preferably comprises a pair of suitably connected longitudinally extending angle bars 15 converging at their rear ends as shown in Figure 1 and being connected by a tie plate or bracket 16 and a cross bar 16ª.

The ice cutting means may comprise one or more cutting elements preferably one as shown in the form of a saw 17 rigid on a shaft 18 projecting from a differential housing or casing 19 and operatively connected by suitable gearing therein with a propeller shaft 20 for driving the saw through the ice, indicated at 17ª. The housing 19 is suitably connected with the frame members 15 preferably by a pair of U-shaped bolts 21 surrounding an extension 22 on the housing and projecting through the plate 16 as shown in Figure 2.

Any suitable power means may be provided for driving the propeller shaft 20, but I preferably employ for this purpose a well known type of gasoline motor indicated generally at 23 which is suitably connected with and supported by the front end of the frame members 15. The motor is provided with the usual hood 24, radiator 25 and hand crank 26, together with such essentials as are necessary to complete a power plant of this kind, including a transmission between the motor and the propeller shaft 20 and the usual clutch and brake shafts 27 and 28, respectively. Means is provided for operating these shafts to simultaneously release the clutch and apply the brake comprising the arms 29 and 30, yoke or links 31 and 32, operating rod 33, lever arm 34, and lever 35, with suitable locking means for the lever, as shown in Figure 4. The clutch and brake control lever 35 may be located at any desired point, preferably adjacent the front of the machine at one side of the hood.

A cross bar 36 is mounted in front of the radiator and supported by upstanding rods 37 secured to the side frame members 15 at 38 and further secured by brace bars 39 as shown in Figures 1 and 2. The cross bar 36 affords convenient means by which the machine may be moved from one position to another or pulled over the ice when the saw is in inoperative position as shown in Figure 2.

Simple and easily operated means is provided for both moving the frame upon its pivot 14 to raise and lower the saw into and out of engagement with the ice and for holding it in the desired position of adjustment. This means preferably comprises a lever 40 suitably connected with a bell crank or rock shaft 41 journaled in bearing 42 on the frame members 15, and having angularly disposed arms 43 provided with bolts 44 extending through slots 45 in the upper ends of a pair of supporting arms or levers 46, the lower ends of which are pivoted upon the sled as indicated at 47. Stops 48 are provided upon the frame for engaging the ends of the arms 46 to hold the machine in normal inoperative position as shown in Figure 2. A stop 49 is also provided for the lever 40, as shown in Figure 5, whereby to hold the lever in the position indicated in Figures 4 and 5 when the machine is adjusted to cutting position. In either of the positions shown in Figures 2 and 4 the rocker arms 43 are disposed slightly off the dead center line whereby the parts are readily maintained in the desired position of adjustment. In operating the lever 40 from either of the positions shown it will first move a predetermined distance before the load is applied, due to the pins 44 being free to move in the slots 45, thus permitting the load to be applied while the lever is moving and thereby affording a comparatively easy operation.

The supporting arms or levers 46 are each made in separate sections adjustably connected by bolts 50 extending through slots 51 in the sections as shown in Figure 2, the upper slot not being shown. This arrangement permits of an increase or decrease in the length of the arms thereby permitting a variation in the depth of the cut, as may be desired.

The saw is of a design adapted particularly to serve as a propelling or advancing member for the machine, its teeth being relatively long and so spaced and shaped as to provide relatively large openings therebetween and are adapted to engage the ice at such an angle as to afford a maximum propelling power when driven in the direction indicated by the arrow in Figure 4.

A runner 52 is preferably provided to form a load carrying member for the rear of the machine which, at the same time serves to steady the latter during operation. The front end of the runner is preferably pivoted at 53 to the bottom of the extension 22 of the gear case 19, its rear end being curved upwardly and slotted at 54 to receive a bolt 55 secured upon an extension 56 of the frame which is braced by a connection 57 extending upwardly from the gear case as shown in Figure 4. The slot 54 in the runner permits the latter to be adjusted vertically whereby to allow for the desired adjustment of the frame as previously pointed out. The extension 56 serves also as a handle by which the rear end of the machine may be manually raised and lowered, or moved from one position to another, as desired.

A guard 58 is provided for the saw and is supported at its front end upon one of the frame members 15 and is braced at said end by a bar 59 and also braced at its rear end by an upstanding member 60 secured to the frame extension 56 by any suitable means.

A fuel tank 61 is mounted upon the frame between the engine and the saw for supplying fuel to the engine through a pipe not shown. The tank is braced by suitable straps 62 the rear ends of which are secured upon the frame members 15 while the front ends thereof are supported by an angle bar 63 serving as a tie between the frame members. The frame construction may be modified to strengthen the same whenever desired to suit different loading conditions, and its height varied with respect to the sled or other support therefor to obtain the desired angle for the propeller shaft best suited to the operation of the latter.

The present machine has been designed with the idea in view of so locating the pivot points 14 and arranging the parts carried by the frame as to afford a substantially balanced structure requiring but little effort in manually shifting the lever 40 to effect movement of the machine to and from operating position.

The machine is provided with self-steering or guiding means comprising shoes 64 adapted to extend into the kerf made by the saw as indicated at 65 in Figure 3, the shoes being supported by a runner 66 mounted for lateral adjustment upon a suitable frame 67 pivotally disposed in bearings 68 on the sled to permit it to swing between the vertical position shown at the right of Figure 3 and the horizontal guiding position shown at the left of said figure, the right hand frame being of less width than the opposite frame to afford equal spacings for the saw cuts. The frame may be held in the vertical position by any suitable means such as a hook 69 on the side frame members 15.

By loosening the bolts 70 of the clamping member 71 and shifting the runner 66 inwardly or outwardly upon the frame 67 the ice may be cut in cakes of any desired width, it being understood that a series of parallel cuts are first made by operating the machine back and forth over the ice field to cover the desired area and then operating it in a direction at a right angle to the first series of cuts to complete the cutting operations.

The transmission mechanism is provided with a suitable cover 72 having a door 73 adapted to render the operating parts of said mechanism accessible through the cover.

While the machine shown in the drawings of the present application affords a simple and practical embodiment of the invention it will be understood that the different forms of construction and arrangement of parts may be modified to a considerable extent without departing from the scope of the invention as covered by the claims.

I claim as my invention:

1. In an ice cutting machine, the combination of a sled adapted to travel upon the ice, a frame pivotally connected therewith intermediate its ends, a motor located upon the frame at one side of the pivot, a cutting element upon the frame at the opposite side of said pivot, upstanding arms pivoted upon the sled between the pivotal axis of the frame and said cutting element, a rock shaft extending transversely across the frame between the motor and cutting element including angularly disposed arms pivotally connected with said upstanding arms and spaced stops on the frame for holding said arms and rock shaft in their different positions of adjustment.

2. In an ice cutting machine, the combination of a sled, a frame, a motor adjacent one end of the frame, a cutting element adjacent the opposite end of the frame, means operatively connecting the motor with the cutting element, pivotal supporting members for the frame connecting it with the sled at its opposite sides, additional supporting means for the frame embodying upstanding members pivoted upon the opposite sides of the sled rearwardly of the first mentioned pivots, a device pivotally connecting said upstanding members with the frame and operable to adjust the frame upon said first mentioned pivots and a stop in the path of one of said upstanding members adapted to engage and hold it in one position of adjustment.

3. An ice cutting machine comprising a sled, a motor, a gear case, a stub shaft journaled therein, a cutting element carried by the stub shaft, a propeller shaft extending from the motor having its rear end journaled in the gear case and operatively connected with the stub shaft, a frame comprising side rails pivoted intermediate their ends upon the sled and adapted to support the motor, said rails converging rearwardly to a point adjacent the gear case, means connecting said gear case with said converging ends and an extension projecting rearwardly from said ends and forming a handle for raising the gear case and parts supported thereby.

4. In an ice cutting machine, the combination of a sled, upstanding supports upon the sled, a frame pivoted intermediate its ends above the sled and upon the supports and including side rails extending rearwardly of the sled, a support secured to the rear ends of said side rails, a stub shaft journaled in said support, a saw mounted upon said shaft, a propeller shaft adapted to be driven by the motor and extending therefrom rearwardly to the support, means operatively connecting the propeller shaft, means comprising swingingly mounted cooperating parts interposed between the frame and sled for adjusting the former upon the latter, a stop on the frame for engaging one of the parts whereby to hold the frame in one adjusted position and a second stop on the frame arranged to engage another of said parts whereby to hold the frame in another position of adjustment.

5. In an ice cutting machine, the combination of a sled, a frame pivotally connected therewith intermediate its ends, a motor located upon one end of the frame, a cutting element upon the other end of the frame, means operatively connecting the motor with the cutting element, raising and lowering means for the frame comprising interconnected parts, one of which is mounted to swing upon the rear end of the sled and another upon the frame between the motor and cutting element, a stop on the frame for engaging and holding one of said parts to support the frame in one position of adjustment, and a second stop on the frame for engaging another of said parts to hold the frame in a different position of adjustment.

GLENN C. WRIGHT.